United States Patent
Yang et al.

(10) Patent No.: US 12,218,882 B2
(45) Date of Patent: Feb. 4, 2025

(54) HYBRID TIME SLOT SCHEDULING METHOD FOR WIRELESS NETWORK

(71) Applicant: WUHAN UNIVERSITY, Wuhan (CN)

(72) Inventors: Jianfeng Yang, Wuhan (CN); Chengcheng Guo, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 446 days.

(21) Appl. No.: 17/858,781

(22) Filed: Jul. 6, 2022

(65) Prior Publication Data

US 2023/0007895 A1   Jan. 12, 2023

(30) Foreign Application Priority Data

Jul. 12, 2021   (CN) .......................... 202110782535.9

(51) Int. Cl.
*H04L 5/00*   (2006.01)
*H04W 72/0446*   (2023.01)
*H04W 72/12*   (2023.01)

(52) U.S. Cl.
CPC ....... *H04L 5/0082* (2013.01); *H04W 72/0446* (2013.01); *H04W 72/12* (2013.01)

(58) Field of Classification Search
CPC .. H04L 5/0082; H04W 72/12; H04W 72/0446
USPC ....................................................... 370/329
See application file for complete search history.

(56) References Cited

U.S. PATENT DOCUMENTS

| | | | |
|---|---|---|---|
| 6,982,987 B2* | 1/2006 | Cain | H04W 72/542 |
| | | | 370/444 |
| 2010/0189086 A1* | 7/2010 | Kats | H04W 74/04 |
| | | | 370/338 |
| 2011/0044174 A1* | 2/2011 | Szymanski | H04L 47/6295 |
| | | | 370/238 |
| 2012/0320881 A1* | 12/2012 | Hong | H04B 7/2646 |
| | | | 370/336 |
| 2015/0139198 A1* | 5/2015 | Hwang | H04W 52/0203 |
| | | | 370/336 |
| 2017/0243485 A1* | 8/2017 | Rubin | H04W 4/46 |
| 2022/0368779 A1* | 11/2022 | Jing | H04L 67/62 |

\* cited by examiner

*Primary Examiner* — Christopher M Crutchfield
*Assistant Examiner* — Jean F Voltaire (57) ABSTRACT

The present disclosure selects a node generating a periodic time slot request in a network to construct a set of periodic time slot request generation nodes, and constructs a time slot request cycle set; selects a node generating an aperiodic time slot request in the network to construct a set of aperiodic time slot request generation nodes, and constructs a time set of the aperiodic time slot request generation nodes; calculates a time slot contention scheduling parameter of each node in the set of the periodic time slot request generation nodes; and if no aperiodic time slot request arrives, allocates a time slot to each time slot requesting node during periodic time slot scheduling; or if an aperiodic time slot request, namely, a sporadic time slot request, arrives, performs rescheduling through hybrid time slot scheduling based on arrival time of the aperiodic time slot request.

6 Claims, 3 Drawing Sheets

HYBRID TIME SLOT SCHEDULING METHOD FOR WIRELESS NETWORK

CROSS REFERENCE TO RELATED APPLICATION

This patent application claims the benefit and priority of Chinese Patent Application No. 202110782535.9, filed on Jul. 12, 2021, the disclosure of which is incorporated by reference herein in its entirety as part of the present application.

TECHNICAL FIELD

The present disclosure relates to the technical field of wireless communication, and in particular, to a hybrid time slot scheduling method for a wireless network.

BACKGROUND ART

An industrial control network is a typical application of a wireless control network, and is often used in factory automation and other fields. As a network with a high requirement for real-time performance, the industrial control network requires that a data packet can be received by a destination node within a deadline, and a mechanism of a media access control (MAC) layer is very important for the real-time performance. For this, extensive research has been carried out in the industry and some progress has been made. Considering periodicity and real-time requirements of communication of the control network, as well as a cost-effective characteristic of a wireless fidelity (Wi-Fi) device, the academia currently focuses on long-distance communication and real-time control when realizing a Time Division Multiple Access (TDMA) protocol for an IEEE802.11-based device.

The Wi-Fi TDMA protocol is used for long-distance communication. In 2006, by using a conventional commercial 802.11 device, the TIER research group of the Berkeley research institute designed a TDMA mechanism to replace a contention access mechanism to resolve a network access problem in remote areas. In 2009, researchers from Indian Institute of Technology released the design and implementation of a multi-hop TDMA system based on Multiband Atheros Driver for Wi-Fi (MADWIFI). The multi-hop TDMA system resolves a problem of low accuracy of clock synchronization in long-distance communication. In addition, robustness of the multi-hop TDMA system is verified through tests, and the multi-hop TDMA system has been initially put into commercial use. In addition, Tianjin University has also carried out similar research in National Natural Science Foundation of China (NFSC) projects undertaken in 2008 and 2012.

The Wi-Fi TDMA protocol is used for the control network. At present, research on application of industrial control is mainly carried out in the academic field. Based on an Atheros5000 chip driver, Shenyang Institute of Automation, Chinese Academy of Sciences designed a TDMA protocol for an industrial wireless network, which has been improved and transplanted to an Atheros9000 network card chip by Xi'an University of Electronic Science and Technology. However, the Wi-Fi TDMA technology only considers an industrial network environment. This is far different from a hybrid wireless network environment in which a variety of different devices and protocols coexist in new scenarios such as smart home, smart city and intelligent transportation. In the research on a real-time Wi-Fi technology, the University of Texas at Austin improves real-time performance of Wi-Fi TDMA in control applications by sending two frames continuously (rather than re-contention).

The TDMA protocol corresponding to the IEEE802.11 protocol can provide deterministic delay guarantee, while Wi-Fi has characteristics such as high speed and good security. According to the TDMA protocol, each communication node is assigned an independent time slot for data sending and reception, and turns to a sleep state in an idle time slot without sending and reception. The TDMA protocol ensures that a station can obtain a wireless channel in time, so as to reduce a sending delay, and is an effective means to ensure real-time performance of Wi-Fi. A time slot is a basic time unit of a TDMA system. A size of the time slot directly determines key performance indicators such as a data frame transmission deadline and a network throughput.

In a Wi-Fi network, time slot allocation is a key to meet a real-time requirement and improve efficiency of data transmission. Especially when there are periodic and sporadic time slot requests in the network, a higher requirement is imposed on time slot allocation. For time slot allocation requested periodically and sporadically, the present disclosure adopts hybrid dynamic time slot allocation to maximize efficiency of time slot scheduling.

SUMMARY

In order to resolve the technical problems, the present disclosure adopts a hybrid time slot scheduling method for a wireless network. Specific steps are as follows:

step 1: selecting a node generating a periodic time slot request in a network to construct a set of periodic time slot request generation nodes, and constructing a time slot request cycle set;

step 2: selecting a node generating an aperiodic time slot request in the network to construct a set of aperiodic time slot request generation nodes, and constructing a time set of the aperiodic time slot request generation nodes;

step 3: calculating a time slot contention scheduling parameter of each node in the set of the periodic time slot request generation nodes; and step 4: if no aperiodic time slot request arrives, allocating a time slot to each time slot requesting node during periodic time slot scheduling; or step 5: if an aperiodic time slot request, namely, a sporadic time slot request, arrives, performing rescheduling through hybrid time slot scheduling based on arrival time of the aperiodic time slot request.

Preferably, the selecting a node generating a periodic time slot request in a network in step 1 specifically includes:

defining, as a periodic time slot request generation node, the node periodically generating a time slot request in the network;

the set of the periodic time slot request generation nodes in step 1 is specifically as follows:

$$\varphi_k = \{N_{0,k}, N_{1,k}, N_{2,k}, \ldots N_{n-1,k}\}$$

where $\varphi_k$ represents a set of periodic time slot request generation nodes at a $k^{th}$ time point, $N_{i,k}$ represents an $i^{th}$ node in the set of the periodic time slot request generation nodes at the $k^{th}$ time point, n represents a quantity of the periodic time slot request generation nodes, $i \in [0, n-1]$, $k \in [1, L]$, L represents a quantity of time points; and the time slot request cycle set in step 1 is specifically as follows:

$$TA_K = \{\tau_{0,k}, \tau_{1,k}, \tau_{2,k}, \ldots \tau_{n-1,k}\}$$

where $TA_k$ represents a set of periodic time slot requests at the $k^{th}$ time point, $\tau_{i,k}$ represents a time slot request cycle of an $i^{th}$ node in the set of the periodic time slot request generation nodes at the $k^{th}$ time point, n represents the quantity of the periodic time slot request generation nodes, L represents the quantity of time points, $i \in [0, n-1]$, and $k \in [1, L]$.

Preferably, the selecting a node generating an aperiodic time slot request in the network in step 2 specifically includes:

defining, as an aperiodic time slot request generation node, the node generating the aperiodic time slot request in the network, where the aperiodic time slot request generated by the aperiodic time slot request generation node is defined as the sporadic time slot request;

the set of the aperiodic time slot request generation nodes in step 2 is specifically as follows:

$$\delta_k = \{M_{0,k}, M_{1,k}, M_{2,k}, \ldots M_{m-1,k}\}$$

where $\delta_k$ represents a set of aperiodic time slot request generation nodes at a $k^{th}$ time point, $M_{j,k}$ represents a $j^{th}$ node in the set of the aperiodic time slot request generation nodes at the $k^{th}$ time point, m represents a quantity of the aperiodic time slot request generation nodes, L represents a quantity of time points, and $k \in [1, L]$, and $j \in [0, m-1]$;

the time set of the aperiodic time slot request generation nodes in step 2 is specifically as follows:

$$time_k = \{(t_{0,k}, D_{0,k}), (t_{1,k}, D_{1,k}), \ldots, (t_{m-1,k}, D_{m-1,k})\}$$

where $time_k$ represents a time set of the aperiodic time slot request generation nodes at the $k^{th}$ time point, $t_{j,k}$ represents arrival time of an aperiodic time slot request of a $j^{th}$ node in the time set of the aperiodic time slot request generation nodes at the $k^{th}$ time point, $D_{j,k}$ represents a deadline of the aperiodic time slot request of the $j^{th}$ node in the time set of the aperiodic time slot request generation nodes at the $k^{th}$ time point, m represents the quantity of the aperiodic time slot request generation nodes, L represents the quantity of time points, $k \in [1, L]$, and $j \in [0, m-1]$; and a deadline $D_j$ of the time slot request is alternatively represented by a quantity of time slots between the deadline $D_j$ of the time slot request and arrival time $t_j$ of the time slot request after the time slot request arrives.

Preferably, the time slot contention scheduling parameter of each node in the set of the periodic time slot request generation nodes in step 3 is specifically calculated according to the following formula:

$$\rho_{i,k} = \frac{BSN_{i,k}}{\sum_{i=0}^{n-1} BSN_{i,k}} * \frac{BN_{i,k}}{\sum_{i=0}^{n-1} BN_{i,k}}$$

$K \in [1, L]$ where $BSN_{i,k}$ represents a maximum time slot interval of a backoff of node $N_{i,k}$ before next time slot allocation, a maximum quantity of steps backed off by each node is 0 at the beginning of time slot allocation, L represents a quantity of time points, and n represents a quantity of the periodic time slot request generation nodes; the backoff means that during time slot allocation for node $N_{i,k}$, due to existence of another node, a time slot required by node $N_{i,k}$ is occupied, resulting in delayed allocation of the time slot required by node $N_{i,k}$; $BN_{i,k}$ represents a total quantity of backoffs of node $N_{i,k}$ before next time slot allocation; and at the beginning of time slot allocation, a total quantity of backoffs of each node is 0; and a larger value of $\rho_i$ leads to more backoffs of node $N_i$ in time slot contention and more steps backed off; and the time slot contention scheduling parameter $\rho_i$ is calculated and recorded during scheduling.

Preferably, the allocating a time slot to each time slot requesting node during periodic time slot scheduling in step 4 is constituted by initial time slot scheduling and subsequent time slot scheduling;

during the initial time slot scheduling, time slot scheduling is performed by giving priority to a shortest cycle;

the node periodically generating a time slot request in the network is defined as a periodic time slot request generation node, where the set of the periodic time slot request generation nodes is specifically as follows:

$$\varphi_k = \{N_{0,k}, N_{1,k}, N_{2,k}, \ldots N_{n-1,k}\}$$

where $\varphi_k$ represents a set of periodic time slot request generation nodes at a $k^{th}$ time point, $N_{i,k}$ represents an $i^{th}$ node in the set of the periodic time slot request generation nodes at the $k^{th}$ time point, n represents a quantity of the periodic time slot request generation nodes, $i \in [0, n-1]$, $k \in [1, L]$, and L represents a quantity of time points;

traversal is performed on $\varphi_k$ by using $\varphi'_k$, wherein nodes in $\varphi'_k$ are sorted based on a time slot cycle of each node in $\varphi_k$ in descending order:

$$\varphi'_k = \{N'_{0,k}, N'_{1,k}, N'_{2,k}, \ldots N'_{n-1,k}\}$$

where the nodes in $\varphi'_k$ are sorted in ascending order based on sizes of time slot cycles, specifically: in $\varphi'_k$, a first node, namely, $N'_{0,k}$, is a node with a shortest time slot cycle, $N'_{1,k}$ is a node with a second shortest time slot cycle, $N'_{2,k}$ is a node with a third shortest time slot cycle, ..., and $N'_{n-1,k}$ is a node with a longest time slot cycle; and if there are two or more nodes with a same time slot cycle, they are sorted based on their subscript numbers in $\varphi'_k$, and a node with a smaller subscript number is sorted as a node with a shorter time slot cycle;

the subsequent time slot scheduling is constituted by subsequent contention-free time slot scheduling and subsequent contention-based time slot scheduling;

the subsequent contention-free time slot scheduling includes:

allocating a time slot to each node by cycle because the subsequent contention-free time slot scheduling belongs to periodic scheduling, which specifically includes:

allocating the time slot to each node based on a sorting in $\varphi'_k$, in other words, allocating a time slot to $N'_{0,k}$ first, then allocating a time slot to $N'_{1,k}$, and so on, until time slot requests of all the nodes are satisfied;

the subsequent contention-based time slot scheduling includes:

calculating the time slot contention scheduling parameter $\rho_{i,k}$ of each contention node, and preferentially allocating a time slot to a node with a large value of the time slot contention scheduling parameter $\rho_{i,k}$;

the time slot contention scheduling parameter of each node in the set of the periodic time slot request generation nodes is specifically calculated according to the following formula:

$$\rho_{i,k} = \frac{BSN_{i,k}}{\sum_{i=0}^{n-1} BSN_{i,k}} * \frac{BN_{i,k}}{\sum_{i=0}^{n-1} BN_{i,k}}$$

$K \in [1, L]$ where $BSN_{i,k}$ represents a maximum time slot interval of a backoff of node $N_{i,k}$ before next time slot allocation, a maximum quantity of steps backed off by each node is 0 at the beginning of time slot allocation, L represents a quantity of time points, and n represents a quantity of the periodic time slot request generation nodes; and the backoff means that during time slot allocation for node $N_{i,k}$, due to existence of another node, a time slot required by node $N_{i,k}$ is occupied, resulting in delayed allocation of the time slot required by node $N_{i,k}$; $BN_{i,k}$ represents a total quantity of backoffs of node $N_{i,k}$ before next time slot allocation; and at the beginning of time slot allocation, a total quantity of backoffs of each node is 0;

a larger value of $\rho_i$ leads to more backoffs of node $N_i$ in time slot contention and more steps backed off; and the time slot contention scheduling parameter $\rho_i$ is calculated and recorded during scheduling;

a node with a contention relationship is referred to as a contention node; the time slot contention scheduling parameter $\rho_{i,k}$ of each contention node is calculated; then the corresponding contention node is sorted in descending order based on a value of the time slot contention scheduling parameter $\rho_{i,k}$:

$$\theta_k = \{C_{0,K}, C_{1,K}, C_{2,K}, \ldots C_{m-1,K}\};$$

and in $\theta_k$, a time slot connection scheduling parameter $\alpha_0$ of node $C_{0,k}$ is largest, a time slot contention scheduling parameter $\alpha_1$ of $C_{1,k}$ is the second largest, and so on; and then, a time slot is allocated to node $C_{0,k}$ first, then a time slot is allocated to node $C_{1,k}$, and so on, until time slot requests of all nodes in $\theta_k$ are satisfied.

Preferably, in step 5, to-be-allocated time slot requests include the periodic time slot request and the aperiodic time slot request; and the performing rescheduling through hybrid time slot scheduling in step 5 includes the following sub-steps:

step 5.1: scheduling the periodic time slot request according to the periodic scheduling method described in step 4;

step 5.2: searching for an available time slot before a deadline of the aperiodic time slot request arrives; and if there is an available time slot, allocating a first available time slot found to the aperiodic time slot request, and ending the scheduling; or if there is no available time slot, performing step 5.3; and step 5.3: returning to step 5.1, and regarding the aperiodic time slot request as a periodic time slot request with a cycle of 0 to perform time slot scheduling until the time slot scheduling is completed.

Compared with the technology in BACKGROUND ART, the present disclosure has the following beneficial effects:

The method in the present disclosure defines the periodic time slot request and the aperiodic time slot request; and when there is no aperiodic time slot request, performs time slot scheduling by giving priority to a periodic slot request with a shortest cycle; or when there is an aperiodic time slot request, preferentially searches for an available time slot based on a time limit requirement of the periodic time slot request for allocation, and when there is no available time slot, performs hybrid time slot scheduling. The method realizes hybrid time slot scheduling for periodic and aperiodic time slot requests, and improves efficiency of time slot scheduling and utilization of a time slot.

High efficiency is achieved. The scheduling method in the present disclosure resolves a scheduling conflict by using parameters, and can efficiently and quickly complete overall time slot scheduling.

Dynamic hybrid scheduling is realized. The scheduling method in the present disclosure can dynamically schedule the periodic and aperiodic time slot requests, and realizes hybrid scheduling of two kinds of time slot requests with different properties.

DETAILED DESCRIPTION OF THE EMBODIMENTS

To make the objectives, technical solutions, and advantages of the present disclosure clearer, the present disclosure is further described below in detail with reference to the drawings and embodiments. It should be understood that the specific embodiments described herein are only used to explain the present disclosure, but not to limit the present disclosure. That is, the described embodiments are only some rather than all embodiments of the present disclosure. All other embodiments obtained by a person of ordinary skill in the art based on the embodiments of the present disclosure without creative efforts shall fall within the protection scope of the present disclosure.

A first specific embodiment of the present disclosure provides a hybrid time slot scheduling method for a wireless network. Specific steps are as follows.

Step 1: Select a node generating a periodic time slot request in a network to construct a set of periodic time slot request generation nodes, and construct a time slot request cycle set.

The selecting a node generating a periodic time slot request in a network in step 1 specifically includes:

defining, as a periodic time slot request generation node, the node periodically generating a time slot request in the network.

The set of the periodic time slot request generation nodes in step 1 is specifically as follows:

$$\varphi_k = \{N_{0,k}, N_{1,k}, N_{2,k}, \ldots N_{n-1,k}\}$$

where $\varphi_k$ represents a set of periodic time slot request generation nodes at a $k^{th}$ time point, $N_{i,k}$ represents an $i^{th}$ node in the set of the periodic time slot request generation nodes at the $k^{th}$ time point, n represents a quantity of the periodic time slot request generation nodes, $i \in [0, n-1]$, $k \in [1, L]$, and L represents a quantity of time points.

The time slot request cycle set in step 1 is specifically as follows:

$$TA_K = \{\tau_{0,k}, \tau_{1,k}, \tau_{2,k}, \ldots \tau_{n-1,k}\}$$

where $TA_k$ represents a set of periodic time slot requests at the $k^{th}$ time point, $\tau_{i,k}$ represents a time slot request cycle of an $i^{th}$ node in the set of the periodic time slot request generation nodes at the $k^{th}$ time point, n represents the quantity of the periodic time slot request generation nodes, L represents the quantity of time points, $i \in [0, n-1]$, and $k \in [1, L]$.

Step 2: Select a node generating an aperiodic time slot request in the network to construct a set of aperiodic time slot request generation nodes, and construct a time set of the aperiodic time slot request generation nodes.

The selecting a node generating an aperiodic time slot request in the network in step 2 specifically includes:

defining, as an aperiodic time slot request generation node, the node generating the aperiodic time slot request in the network, where the aperiodic time slot request generated by the aperiodic time slot request generation node is defined as a sporadic time slot request.

The set of the aperiodic time slot request generation nodes in step 2 is specifically as follows:

$$\delta_k = \{M_{0,k}, M_{1,k}, M_{2,k}, \ldots, M_{m-1,k}\}$$

where $\delta_k$ represents a set of aperiodic time slot request generation nodes at the $k^{th}$ time point, $M_{j,k}$ represents a $j^{th}$ node in the set of the aperiodic time slot request generation nodes at the $k^{th}$ time point, m represents a quantity of the aperiodic time slot request generation nodes, L represents the quantity of time points, $k \in [1, L]$, and $j \in [0, m-1]$.

The time set of the aperiodic time slot request generation nodes in step 2 is specifically as follows:

$$time_k = \{(t_{0,k}, D_{0,k}), (t_{1,k}, D_{1,k}), \ldots, (t_{m-1,k}, D_{m-1,k})\}$$

where $time_k$ represents a time set of the aperiodic time slot request generation nodes at the $k^{th}$ time point, $t_{j,k}$ represents arrival time of an aperiodic time slot request of a $j^{th}$ node in the time set of the aperiodic time slot request generation nodes at the $k^{th}$ time point, $D_{j,k}$ represents a deadline of the aperiodic time slot request of the $j^{th}$ node in the time set of the aperiodic time slot request generation nodes at the $k^{th}$ time point, m represents the quantity of the aperiodic time slot request generation nodes, L represents the quantity of time points, $k \in [1, L]$, and $j \in [0, m-1]$; and a deadline $D_j$ of the time slot request is alternatively represented by a quantity of time slots between the deadline $D_j$ of the time slot request and arrival time $t_j$ of the time slot request after the time slot request arrives.

Step 3: Calculate a time slot contention scheduling parameter of each node in the set of the periodic time slot request generation nodes.

The time slot contention scheduling parameter of each node in the set of the periodic time slot request generation nodes in step 3 is specifically calculated according to the following formula:

$$\rho_{i,k} = \frac{BSN_{i,k}}{\sum_{i=0}^{n-1} BSN_{i,k}} * \frac{BN_{i,k}}{\sum_{i=0}^{n-1} BN_{i,k}}$$

$K \in [1, L]$ where $BSN_{i,k}$ represents a maximum time slot interval of a backoff of node $N_{i,k}$ before next time slot allocation, a maximum quantity of steps backed off by each node is 0 at the beginning of time slot allocation, L represents the quantity of time points, and n represents the quantity of the periodic time slot request generation nodes; and the backoff means that during time slot allocation for node $N_{i,k}$, due to existence of another node, a time slot required by node $N_{i,k}$ is occupied, resulting in delayed allocation of the time slot required by node $N_{i,k}$; $BN_{i,k}$ represents a total quantity of backoffs of node $N_{i,k}$ before next time slot allocation; and at the beginning of time slot allocation, a total quantity of backoffs of each node is 0; and a larger value of $\rho_i$ leads to more backoffs of node $N_i$ in time slot contention and more steps backed off; and the time slot contention scheduling parameter $\rho_i$ is calculated and recorded during scheduling:

Step 4: If no aperiodic time slot request arrives, allocate a time slot to each time slot requesting node during periodic time slot scheduling.

The allocating a time slot to each time slot requesting node during periodic time slot scheduling in step 4 is constituted by initial time slot scheduling and subsequent time slot scheduling.

During the initial time slot scheduling, time slot scheduling is performed by giving priority to a shortest cycle.

The node periodically generating a time slot request in the network is defined as a periodic time slot request generation node, where the set of the periodic time slot request generation nodes is specifically as follows:

$$\varphi_k = \{N_{0,k}, N_{1,k}, N_{2,k}, \ldots, N_{n-1,k}\}$$

where $\varphi_k$ represents the set of the periodic time slot request generation nodes at the $k^{th}$ time point, $N_{i,k}$ represents the $i^{th}$ node in the set of the periodic time slot request generation nodes at the $k^{th}$ time point, n represents the quantity of the periodic time slot request generation nodes, $i \in [0, n-1]$, $k \in [1, L]$, and L represents the quantity of time points;

Traversal is performed on $\varphi_k$ by using $\varphi_k$, wherein nodes in $\varphi'_k$ are sorted based on a time slot cycle of each node in $\varphi_k$ in descending order:

$$\varphi'_k = \{N'_{0,k}, N'_{1,k}, N'_{2,k}, \ldots, N'_{n-1,k}\}$$

where the nodes in $\varphi'_k$ are sorted in ascending order based on sizes of time slot cycles, specifically: in $\varphi'_k$, a first node, namely, $N'_{0,k}$, is a node with a shortest time slot cycle, $N'_{1,k}$ is a node with a second shortest time slot cycle, $N'_{2,k}$ is a node with a third shortest time slot cycle, . . . , and $N'_{n-1,k}$ is a node with a longest time slot cycle; and if there are two or more nodes with a same time slot cycle, they are sorted based on their subscript numbers in $\varphi'_k$, and a node with a smaller subscript number is sorted as a node with a shorter time slot cycle.

Figure 1:
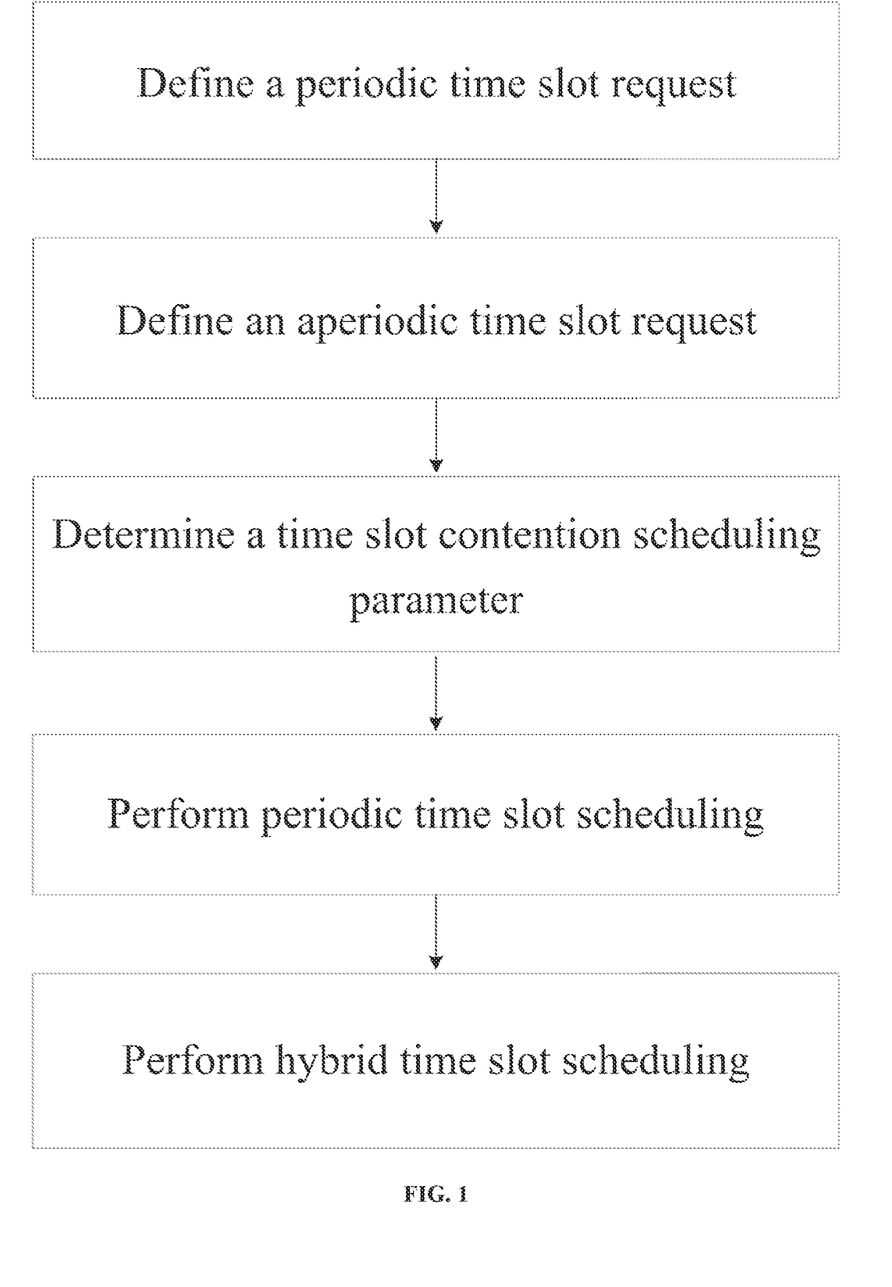
FIG. 1 shows implementation steps of the present disclosure.
Figure 2:
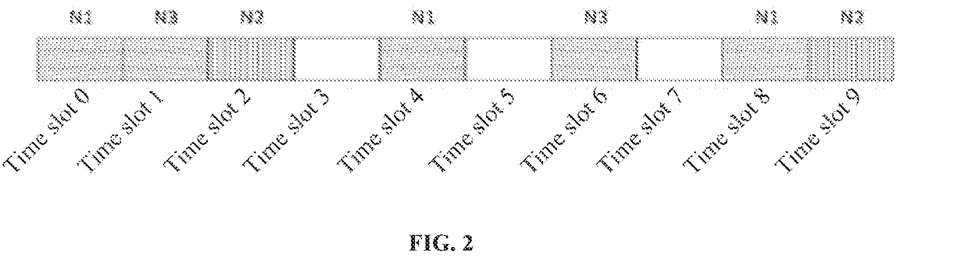
FIG. 2 is a schematic diagram of a time slot scheduling result of a periodic time slot request.

For three nodes in Table 1, after they are sorted based on sizes of their cycles, $N_0$ has a shortest cycle, $N_2$ has a second shortest cycle, and $N_1$ has a longest cycle. In this case, a result of time slot scheduling by giving priority to the shortest cycle is shown in FIG. 2.

The subsequent time slot scheduling is constituted by subsequent contention-free time slot scheduling and subsequent contention-based time slot scheduling.

The subsequent contention-free time slot scheduling includes:

allocating a time slot to each node by cycle because the subsequent contention-free time slot scheduling belongs to periodic scheduling, which specifically includes:

allocating the time slot to each node based on a sorting in $\varphi'_k$, in other words, allocating a time slot to $N'_{0,k}$ first, then allocating a time slot to $N'_{1,k}$, and so on, until time slot requests of all the nodes are satisfied.

The subsequent contention-based time slot scheduling includes:

calculating the time slot contention scheduling parameter $\rho_{i,k}$ of each contention node, and preferentially allocating a time slot to a node with a large value of the time slot contention scheduling parameter $\rho_{i,k}$.

The time slot contention scheduling parameter of each node in the set of the periodic time slot request generation nodes is specifically calculated according to the following formula:

$$\rho_{i,k} = \frac{BSN_{i,k}}{\sum_{i=0}^{n-1} BSN_{i,k}} * \frac{BN_{i,k}}{\sum_{i=0}^{n-1} BN_{i,k}}$$

$K \in [1, L]$ where $BSN_{i,k}$ represents the maximum time slot interval of the backoff of node $N_{i,k}$ before next time slot allocation, the maximum quantity of steps backed off by each node is 0 at the beginning of time slot allocation, L represents the quantity of time points, and n represents the quantity of the periodic time slot request generation nodes; and the backoff means that during time slot allocation for node $N_{i,k}$, due to the existence of the another node, the time slot required by node $N_{i,k}$ is occupied, resulting in delayed allocation of the time slot required by node $N_{i,k}$; $BN_{i,k}$ represents the total quantity of backoffs of node $N_{i,k}$ before next time slot allocation; and at the beginning of time slot allocation, the total quantity of backoffs of each node is 0; and the larger value of $\rho_i$ leads to more backoffs of node $N_i$ in time slot contention and more steps backed off; and the time slot contention scheduling parameter $\rho_i$ is calculated and recorded during scheduling.

A node with a contention relationship is referred to as a contention node. The time slot contention scheduling parameter $\rho_{i,k}$ of each contention node is calculated. Then the corresponding contention node is sorted in descending order based on a value of the time slot contention scheduling parameter $\rho_{i,k}$:

$$\theta_k = \{C_{0,K}, C_{1,K}, C_{2,K}, \ldots C_{m-1,K}\}$$

In $\theta_k$, a time slot contention scheduling parameter $\alpha_0$ of node $C_{0,k}$ is largest, a time slot contention scheduling parameter $\alpha_1$ of $C_{1,k}$ is the second largest, and so on. Then, a time slot is allocated to node $C_{0,k}$ first, then a time slot is allocated to node $C_{1,k}$, and so on, until time slot requests of all nodes in $\theta_k$ are satisfied.

Step 5: If an aperiodic time slot request, namely, the sporadic time slot request, arrives, perform rescheduling through hybrid time slot scheduling based on arrival time of the aperiodic time slot request.

In step 5, to-be-allocated time slot requests include the periodic time slot request and the aperiodic time slot request.

The performing rescheduling through hybrid time slot scheduling in step 5 includes the following sub-steps:

Step 5.1: Schedule the periodic time slot request according to the periodic scheduling method described in step 4.

Step 5.2: Search for an available time slot before a deadline of the aperiodic time slot request arrives; and if there is an available time slot, allocate a first available time slot found to the aperiodic time slot request, and end the scheduling; or if there is no available time slot, perform step 5.3.

Step 5.3: Return to step 5.1, and regard the aperiodic time slot request as a periodic time slot request with a cycle of 0 to perform time slot scheduling until the time slot scheduling is completed.

A second specific embodiment of the present disclosure provides a hybrid time slot scheduling method for a wireless network. Specific steps are as follows.

Step 1: Define a periodic time slot request.

Node $N_i$ in a network periodically generates a time slot request with a cycle of $\tau_i$. Therefore, for n nodes connected to the network, the following node set $\varphi$ is available:

$$\varphi = \{N_0, N_1, N_2, \ldots N_{n-1}\}$$

For a network with three nodes, each of the three nodes periodically generates a periodic time slot request, and correspondingly, the following set is available:

$$\varphi = \{N_0, N_1, N_2\}$$

A time slot request cycle of each node is shown in Table 1.

Table 1 Time slot request cycles of the three nodes

| Node | Time slot request cycle |
| --- | --- |
| $N_0$ | $\tau_0 = 4$ |
| $N_1$ | $\tau_1 = 7$ |
| $N_2$ | $\tau_2 = 5$ |

Step 2: Define an aperiodic time slot request.

Node $M_j$ in the network generates the aperiodic time slot request. This kind of aperiodic time slot request, also known as a sporadic time slot request, has arrival time $t_j$ and a deadline $D_j$. Therefore, for m nodes generating aperiodic time slot requests in the network, the following node set $\delta$ is available:

$$\delta = \{M_0, M_1, M_2, \ldots M_{m-1}\}$$

In the above set, $t_j$ is represented by a number of a to-be-allocated time slot when the time slot request arrives; and $D_j$ represents time at which the slot request must be completed, which is alternatively represented by a quantity of time slots between $D_j$ and $t_j$ after the time slot request arrives.

For a network with two nodes, each of the two nodes the aperiodic time slot request, and correspondingly, the following set is available:

$$\delta = \{M_0, M_1\}$$

In the above set, a time slot request cycle of each node is shown in Table 2.

Table 2 Time slot request cycles of the two nodes

| Node | Time slot request cycle |
| --- | --- |
| $M_0$ | $t_0 = 5, D_0 = 3$ |
| $M_1$ | $t_1 = 3, D_1 = 2$ |

Step 3: Determine a time slot contention scheduling parameter.

When a plurality of nodes initiate time slot requests, time slot scheduling is assisted by using the time slot contention scheduling parameter. For node $N_i$, the time slot contention scheduling parameter is $\alpha_i$:

$$\alpha_i = \frac{BSN_i}{\sum_{i=0}^{n-1} BSN_i} * \frac{BN_i}{\sum_{i=0}^{n-1} BN_i}$$

where $BSN_i$ represents a maximum time slot interval of a backoff of node $N_i$ before next time slot allocation, and a maximum quantity of steps backed off by each node is 0 at the beginning of time slot allocation.

The backoff means that during time slot allocation for node $N_i$, due to existence of another node, a time slot required by node $N_i$ is occupied, resulting in delayed allocation of the time slot required by node $N_i$; $BN_i$ represents a total quantity of backoffs of node $N_i$ before next time slot allocation; and at the beginning of time slot allocation, the total quantity of backoffs of each node is 0.

A larger value of $\alpha_i$ leads to more backoffs of node $N_i$ in time slot contention and more steps backed off. The time slot contention scheduling parameter $\alpha_i$ is calculated and recorded during scheduling.

Step 4: Perform periodic time slot scheduling.

When no aperiodic time slot request arrives, periodic time slot scheduling is adopted. During periodic time slot scheduling, a time slot is allocated to each time slot requesting node, which is divided into two sub-steps: initial time slot scheduling and subsequent time slot scheduling.

During the initial time slot scheduling, time slot scheduling is performed by giving priority to a shortest cycle.

For the three nodes in Table 1, after they are sorted based on sizes of their cycles, $N_0$ has a shortest cycle, $N_2$ has a second shortest cycle, and $N_1$ has a longest cycle. In this case, a result of time slot scheduling by giving priority to the shortest cycle is shown in FIG. 2.

The subsequent time slot scheduling includes subsequent contention-free time slot scheduling and subsequent contention-based time slot scheduling.

The subsequent contention-free time slot scheduling includes:

allocating a time slot to each node by cycle because the subsequent contention-free time slot scheduling belongs to periodic scheduling.

The subsequent contention-based time slot scheduling includes:

calculating the time slot contention scheduling parameter $\alpha_i$ of each contention node, and preferentially allocating a time slot to a node with a large value of the time slot contention scheduling parameter $\alpha_i$.

Figure 3:
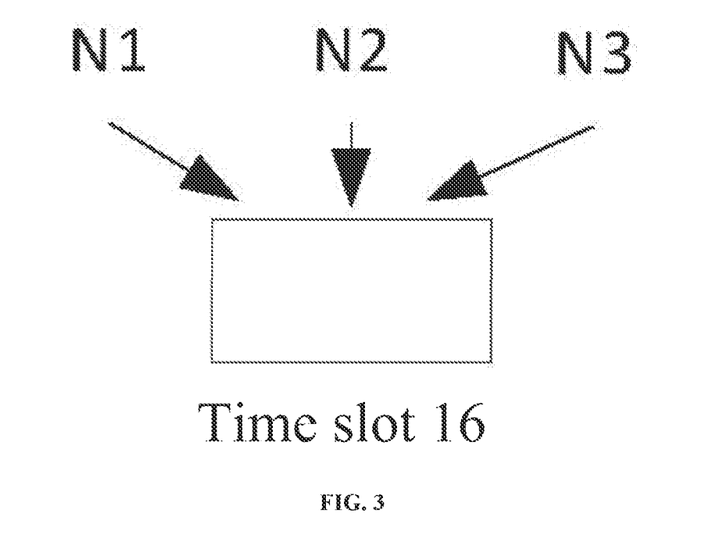
FIG. 3 shows an allocation conflict at time slot 16.

For each node in Table 1, a conflict occurs in a $17^{th}$ slot, namely, time slot 16, as shown in FIG. 3. In this case, rescheduling needs to be performed.

Table 3 Parameters of the three nodes

| Node | Time slot request cycle | $BSN_i$ | $BN_i$ | $\alpha_i$ |
|---|---|---|---|---|
| $N_0$ | $\tau_0 = 4$ | $BSN_0 = 0$ | $BN_0 = 0$ | $\alpha_0 = 0$ |
| $N_1$ | $\tau_1 = 7$ | $BSN_1 = 2$ | $BN_1 = 1$ | $\alpha_1 = 1/3$ |
| $N_2$ | $\tau_2 = 5$ | $BSN_2 = 1$ | $BN_2 = 1$ | $\alpha_2 = 1/2$ |

Figure 4:
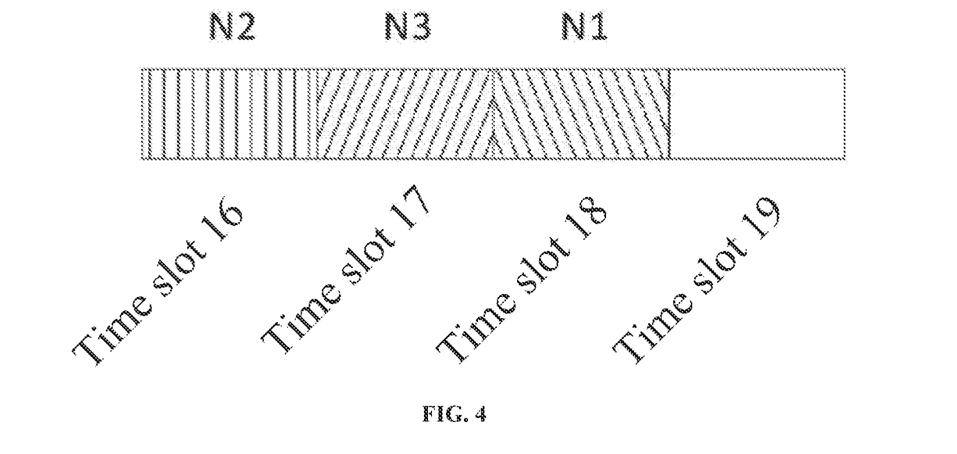
FIG. 4 shows a conflict resolution result determined based on a time slot contention scheduling parameter.

Based on the calculated time slot contention scheduling parameter $\alpha_i$, a time slot is preferentially allocated to $N_2$, then a time slot is allocated to $N_1$, and finally a time slot is allocated to $N_0$. A scheduling result is shown in FIG. 4.

Step 5: Perform hybrid time slot scheduling.

The aperiodic time slot request, namely, the sporadic time slot request, is rescheduled based on the arrival time of the aperiodic time slot request during periodic scheduling. In this case, to-be-allocated time slot requests include the periodic time slot request and the aperiodic time slot request.

A method for hybrid time slot scheduling includes the following steps:

Step 5.1: Schedule the periodic time slot request according to the periodic scheduling method described in step 4.

Step 5.2: Search for an available time slot before a deadline of the aperiodic time slot request arrives; and if there is an available time slot, allocate a first available time slot found to the aperiodic time slot request, and end the scheduling; or if there is no available time slot, perform step 5.3.

Step 5.3: Return to step 5.1, and regard the aperiodic time slot request as a periodic time slot request with a cycle of 0 to perform time slot scheduling until the time slot scheduling is completed.

Figure 5:
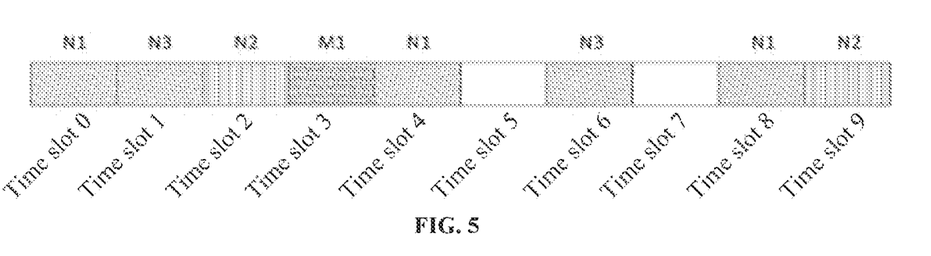
FIG. 5 shows a scheduling result of an aperiodic time slot request of node M1.

For the nodes $N_1$, $N_2$, $N_3$, $M_1$ and $M_2$ in Table 1 and Table 2, according to step 1 above, a result of periodic time slot scheduling is obtained, as shown in FIG. 2; and according to step 2, a time slot request of node $M_1$ arrives first, and the time slot request can be allocated to slot 2 and slot 3. Based on the scheduling result shown in FIG. 2, slot 3 is available, and the aperiodic time slot request of node $M_1$ is allocated to slot 3, as shown in FIG. 5. When a time slot request of node $M_0$ arrives, the time slot request can be allocated to slot 4, slot 5 and slot 6. Based on a scheduling result shown in FIG. 5, slot 5 is available, and the aperiodic time slot request of node $M_0$ is allocated to slot 5.

The specific embodiments described in the present disclosure are merely illustrative of the spirit of the present disclosure. A person skilled in the art can make various modifications or supplements to the specific embodiments described or replace them in a similar manner, but it may not depart from the spirit of the present disclosure or the scope defined by the appended claims.

What is claimed is:

1. A hybrid time slot scheduling method for a wireless network, comprising the following steps:
   step 1: selecting a node generating a periodic time slot request in a network to construct a set of periodic time slot request generation nodes, and constructing a time slot request cycle set;
   step 2: selecting a node generating an aperiodic time slot request in the network to construct a set of aperiodic time slot request generation nodes, and constructing a time set of the aperiodic time slot request generation nodes;
   step 3: calculating a time slot contention scheduling parameter of each node in the set of the periodic time slot request generation nodes; and
   step 4: if no aperiodic time slot request arrives, allocating a time slot to each time slot requesting node during periodic time slot scheduling; or
   step 5: if an aperiodic time slot request, namely, a sporadic time slot request, arrives, performing rescheduling through hybrid time slot scheduling based on arrival time of the aperiodic time slot request.

2. The hybrid time slot scheduling method for a wireless network according to claim 1, wherein
   the selecting a node generating a periodic time slot request in a network in step 1 specifically comprises:
   defining, as a periodic time slot request generation node, the node periodically generating a time slot request in the network;
   the set of the periodic time slot request generation nodes in step 1 is specifically as follows:

$\varphi_k = \{N_{0,k}, N_{1,k}, N_{2,k}, \ldots N_{n-1,k}\}$ wherein $\varphi_k$ represents a set of periodic time slot request generation nodes at a $k^{th}$ time point, $N_{i,k}$ represents an $i^{th}$ node in the set of the periodic time slot request generation nodes at the $k^{th}$ time point, n represents a quantity of the periodic time slot request generation nodes, $i \in [0, n-1]$, $k \in [1, L]$, L represents a quantity of time points; and
   the time slot request cycle set in step 1 is specifically as follows:

$TA_K = \{\tau_{0,k}, \tau_{1,k}, \tau_{2,k}, \ldots \tau_{n-1,k}\}$ wherein $TA_k$ represents a set of periodic time slot requests at the $k^{th}$ time point, $\tau_{i,k}$ represents a time slot request cycle of an $i^{th}$ node in the set of the periodic time slot request generation nodes at the $k^{th}$ time point, n represents the quantity of the periodic time slot request generation nodes, L represents the quantity of time points, $i \in [0, n-1]$, and $k \in [1, L]$.

3. The hybrid time slot scheduling method for a wireless network according to claim 1, wherein
   the selecting a node generating an aperiodic time slot request in the network in step 2 specifically comprises:

defining, as an aperiodic time slot request generation node, the node generating the aperiodic time slot request in the network, wherein the aperiodic time slot request generated by the aperiodic time slot request generation node is defined as the sporadic time slot request;

the set of the aperiodic time slot request generation nodes in step 2 is specifically as follows:

$$\delta_k = \{M_{0,k}, M_{1,k}, M_{2,k} \ldots M_{m-1,k}\}$$

wherein $\delta_k$ represents a set of aperiodic time slot request generation nodes at a $k^{th}$ time point, $M_{j,k}$ represents a $j^{th}$ node in the set of the aperiodic time slot request generation nodes at the $k^{th}$ time point, m represents a quantity of the aperiodic time slot request generation nodes, L represents a quantity of time points, and $k \in [1, L]$, and $j \in [0, m-1]$;

the time set of the aperiodic time slot request generation nodes in step 2 is specifically as follows:

$$time_k = \{(t_{0,k}, D_{0,k}), (t_{1,k}, D_{1,k}), \ldots, (t_{m-1,k}, D_{m-1,k})\}$$

wherein $time_k$ represents a time set of the aperiodic time slot request generation nodes at the $k^{th}$ time point, $t_{j,k}$ represents arrival time of an aperiodic time slot request of a $j^{th}$ node in the time set of the aperiodic time slot request generation nodes at the $k^{th}$ time point, $D_{j,k}$ represents a deadline of the aperiodic time slot request of the $j^{th}$ node in the time set of the aperiodic time slot request generation nodes at the $k^{th}$ time point, m represents the quantity of the aperiodic time slot request generation nodes, L represents the quantity of time points, $k \in [1, L]$, and $j \in [0, m-1]$; and a deadline $D_j$ of the time slot request is alternatively represented by a quantity of time slots between the deadline $D_j$ of the time slot request and arrival time $t_j$ of the time slot request after the time slot request arrives.

4. The hybrid time slot scheduling method for a wireless network according to claim 1, wherein the time slot contention scheduling parameter of each node in the set of the periodic time slot request generation nodes in step 3 is specifically calculated according to the following formula:

$$\rho_{i,k} = \frac{BSN_{i,k}}{\sum_{i=0}^{n-1} BSN_{i,k}} * \frac{BN_{i,k}}{\sum_{i=0}^{n-1} BN_{i,k}}$$

$K \in [1, L]$ wherein $BSN_{i,k}$ represents a maximum time slot interval of a backoff of node $N_{i,k}$ before next time slot allocation, a maximum quantity of steps backed off by each node is 0 at the beginning of time slot allocation, L represents a quantity of time points, and n represents a quantity of the periodic time slot request generation nodes; the backoff means that during time slot allocation for node $N_{i,k}$, due to existence of another node, a time slot required by node $N_{i,k}$ is occupied, resulting in delayed allocation of the time slot required by node $N_{i,k}$; $BN_{i,k}$ represents a total quantity of backoffs of node $N_{i,k}$ before next time slot allocation; and at the beginning of time slot allocation, a total quantity of backoffs of each node is 0; and a larger value of $\rho_i$ leads to more backoffs of node $N_i$ in time slot contention and more steps backed off; and the time slot contention scheduling parameter $\rho_i$ is calculated and recorded during scheduling.

5. The hybrid time slot scheduling method for a wireless network according to claim 1, wherein the allocating a time slot to each time slot requesting node during periodic time slot scheduling in step 4 is constituted by initial time slot scheduling and subsequent time slot scheduling;

during the initial time slot scheduling, time slot scheduling is performed by giving priority to a shortest cycle;

the node periodically generating a time slot request in the network is defined as a periodic time slot request generation node, wherein the set of the periodic time slot request generation nodes is specifically as follows:

$$\varphi_k = \{N_{0,k}, N_{1,k}, N_{2,k}, \ldots N_{n-1,k}\}$$

wherein $\varphi_k$ represents a set of periodic time slot request generation nodes at a $k^{th}$ time point, $N_{i,k}$ represents an $i^{th}$ node in the set of the periodic time slot request generation nodes at the $k^{th}$ time point, n represents a quantity of the periodic time slot request generation nodes, $i \in [0, n-1]$, $k \in [1, L]$, and L represents a quantity of time points;

traversal is performed on $\varphi_k$ by using $\varphi'_k$, wherein nodes in $\varphi'_k$ are sorted based on a time slot cycle of each node in $\varphi_k$ in descending order:

$$\varphi'_k = \{N'_{0,k}, N'_{1,k}, N'_{2,k} \ldots N'_{n-1,k}\}$$

wherein the nodes in $\varphi'_k$ are sorted in ascending order based on sizes of time slot cycles, specifically: in $\varphi'_k$, a first node, namely, $N'_{0,k}$, is a node with a shortest time slot cycle, $N'_{1,k}$ is a node with a second shortest time slot cycle, $N'_{2,k}$ is a node with a third shortest time slot cycle, ..., and $N'_{n-1,k}$ is a node with a longest time slot cycle; and if there are two or more nodes with a same time slot cycle, they are sorted based on their subscript numbers in $\varphi'_k$, and a node with a smaller subscript number is sorted as a node with a shorter time slot cycle;

the subsequent time slot scheduling is constituted by subsequent contention-free time slot scheduling and subsequent contention-based time slot scheduling;

the subsequent contention-free time slot scheduling comprises:

allocating a time slot to each node by cycle because the subsequent contention-free time slot scheduling belongs to periodic scheduling, which specifically comprises:

allocating the time slot to each node based on a sorting in $\varphi'_k$, in other words, allocating a time slot to $N'_{0,k}$ first, then allocating a time slot to $N'_{1,k}$, and so on, until time slot requests of all the nodes are satisfied;

the subsequent contention-based time slot scheduling comprises:

calculating the time slot contention scheduling parameter $\rho_{i,k}$ of each contention node, and preferentially allocating a time slot to a node with a large value of the time slot contention scheduling parameter $\rho_{i,k}$;

the time slot contention scheduling parameter of each node in the set of the periodic time slot request generation nodes is specifically calculated according to the following formula:

$$\rho_{i,k} = \frac{BSN_{i,k}}{\sum_{i=0}^{n-1} BSN_{i,k}} * \frac{BN_{i,k}}{\sum_{i=0}^{n-1} BN_{i,k}}$$

$K \in [1, L]$ wherein $BSN_{i,k}$ represents a maximum time slot interval of a backoff of node $N_{i,k}$ before next time slot allocation, a maximum quantity of steps backed off by each node is 0 at the beginning of time slot allocation, L represents a quantity of time points, and n represents a quantity of the periodic time slot request generation nodes; the backoff means that during time slot allocation for node $N_{i,k}$, due to existence of another node, a time slot required by node $N_{i,k}$ is occupied, resulting in delayed allocation of the time slot required by node $N_{i,k}$; $BN_{i,k}$ represents a total quantity of backoffs of node $N_{i,k}$ before next time slot allocation; and at the beginning of time slot allocation, a total quantity of backoffs of each node is 0;

a larger value of $\rho_i$ leads to more backoffs of node $N_i$ in time slot contention and more steps backed off; and the time slot contention scheduling parameter $\rho_i$ is calculated and recorded during scheduling;

a node with a contention relationship is referred to as a contention node; the time slot contention scheduling parameter $\rho_{i,x}$ of each contention node is calculated; and then the corresponding contention node is sorted in descending order based on a value of the time slot contention scheduling parameter $\rho_{i,k}$;

$\theta_k = \{C_{0,K}, C_{1,K}, C_{2,K}, \ldots C_{m-1,K}\}$; and in $\theta_k$, a time slot contention scheduling parameter $\alpha_0$ of node $C_{0,k}$ is largest, a time slot contention scheduling parameter $\alpha_1$ of $C_{1,k}$ is the second largest, and so on; and then, a time slot is allocated to node $C_{0,k}$ first, then a time slot is allocated to node $C_{1,k}$, and so on, until time slot requests of all nodes in $\theta_k$ are satisfied.

6. The hybrid time slot scheduling method for a wireless network according to claim 1, wherein in step 5, to-be-allocated time slot requests comprise the periodic time slot request and the aperiodic time slot request; and the performing rescheduling through hybrid time slot scheduling in step 5 comprises the following sub-steps:

step 5.1: scheduling the periodic time slot request according to the periodic scheduling method described in step 4;

step 5.2: searching for an available time slot before a deadline of the aperiodic time slot request arrives; and if there is an available time slot, allocating a first available time slot found to the aperiodic time slot request, and ending the scheduling; or if there is no available time slot, performing step 5.3; and step 5.3: returning to step 5.1, and regarding the aperiodic time slot request as a periodic time slot request with a cycle of 0 to perform time slot scheduling until the time slot scheduling is completed.

\* \* \* \* \*